(12) United States Patent
Maeda et al.

(10) Patent No.: US 6,339,821 B1
(45) Date of Patent: Jan. 15, 2002

(54) DATA PROCESSOR CAPABLE OF HANDLING AN INCREASED NUMBER OF OPERATION CODES (75) Inventors: Hiromi Maeda; Akihiko Ishida; Yukihiko Shimazu, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/266,590

(22) Filed: Mar. 11, 1999

(30) Foreign Application Priority Data

Oct. 6, 1998 (JP) .............................. 10-283745

(51) Int. Cl.$^7$ .......................... G06F 9/34; G06F 13/00; G06F 5/00
(52) U.S. Cl. ......................... 712/210; 711/119; 341/78
(58) Field of Search ....................... 711/119; 341/78; 703/25; 712/205–207, 210–215

(56) References Cited

U.S. PATENT DOCUMENTS 4,258,419 A * 3/1981 Blahut et al. ................. 712/210
4,473,881 A * 9/1984 Pilat et al. ..................... 711/119
4,595,911 A * 6/1986 Kregness et al. ............... 341/78
5,301,285 A 4/1994 Hanawa et al. ................ 712/212
6,189,086 B1 * 2/2001 Yamaura ...................... 712/205

* cited by examiner

Primary Examiner—Daniel H. Pan
Assistant Examiner—Te Chen
(74) Attorney, Agent, or Firm—Burns, Doane, Swecker & Mathis, LLP (57) ABSTRACT A data processor is provided to increase the number of instructions it can handle, even with a large number of operands required for the instructions. The data processor comprises a decoding circuit (1) extracting bits (a1, a2) of an instruction as first operand fields and decoding an operation code, using the remaining bits (a4); an operand-field storage portion (3) including a first operand-field storage portion (3a) storing bits (a1, a2) obtained from the decoding circuit (1) via a selector (2), and a second operand-field storage portion (3b) storing a second operand field obtained on the basis of those bits (a2); and a data processing portion (5) receiving the first and the second operand fields from the operand-field storage portion (3) and processing data in registers designated by the first and the second operand fields.

6 Claims, 8 Drawing Sheets

DATA PROCESSOR CAPABLE OF HANDLING AN INCREASED NUMBER OF OPERATION CODES

BACKGROUND OF THE INVENTION

1. Field of the Invention

The present invention relates to a data processor with a plurality of general registers, for processing data stored in those general resisters.

2. Description of the Background Art

Figure 13:
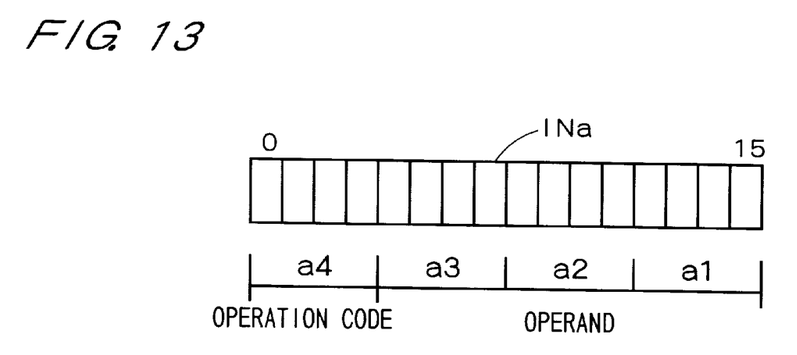
FIG. 13 shows a format of a conventional instruction.

As an example, we will now describe a conventional data processor including 16 general registers and handling an add instruction with three operands. FIG. 13 illustrates a format of an instruction written in the machine language (a language which a computer can understand) for a data processor. The instruction is 16 bits long in which a bit group a4 designates an operation code and each of bit groups a1 to a3 designates an operand field.

Each bit group a1, a2, a3 of the instruction in the machine language needs four bits to designate an address of a general resister. Thus, a bit group a4 of the remaining four bits is assigned to the operation code.

Figure 14:
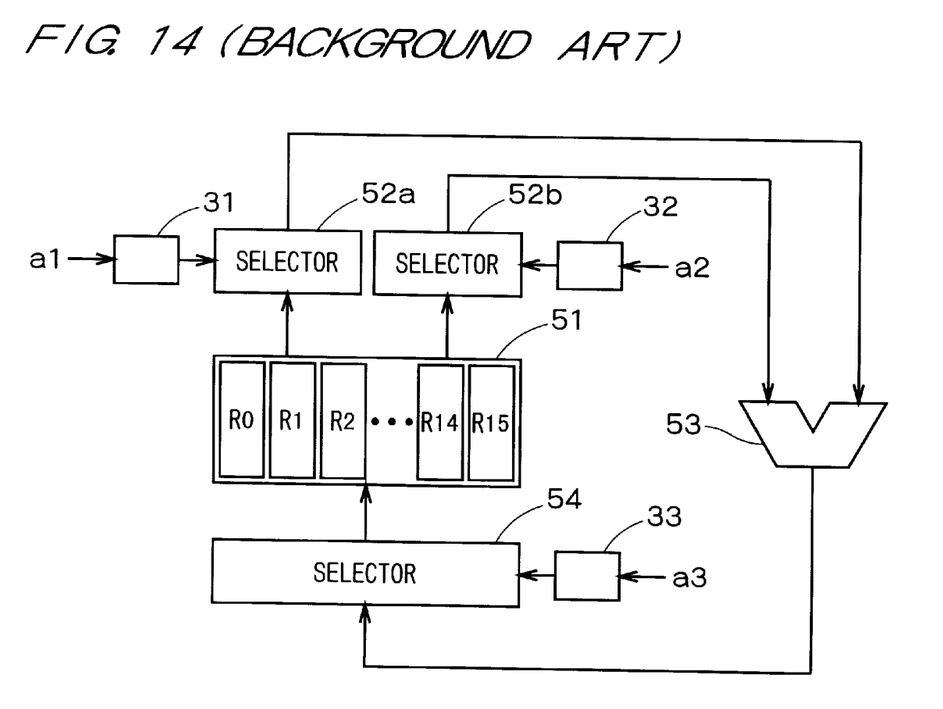
FIG. 14 is a block diagram of a conventional data processor.

Next, part of the conventional data processor is shown in FIG. 14. Operand-field storage regions 31, 32, and 33 store the bit groups a1, a2, and a3, respectively. A register group 51 consists of 16 general resistors R0 to R15 to which addresses #R0 to #R15 are assigned, respectively. An example of the instructions executed by this data processor is shown in Table 1.

TABLE 1

| Instruction INa | | | |
|---|---|---|---|
| a4 | a3 | a2 | a1 |
| ADD | #R2 | #R1 | #R0 |

In Table 1, "ADD/#R2, #R1, #R0" forms an instruction INa, where "/" is a delimiter between the operation code and the operands; ADD is an operation code of a conventional add instruction, corresponding to the bit group a4 in FIG. 13; and #R2, #R1, and #R0 correspond to the bit groups a3, a2, and a1, respectively. At the time of execution of the instruction INa, selectors 52a and 52b read out data from the general registers R0 and R1 corresponding to the bit groups a1 and a2, respectively, in the register group 51. Since the operation code is ADD, an arithmetic circuit 53 adds data obtained by the selector 52a and data obtained by the selector 52b. Then, a selector 54 writes the output of the arithmetic circuit 53 into the general register R2 corresponding to the bit group a3 in the register group 51.

In this fashion, the bit groups a1 and a2 designate storage sources of the data to be processed on the instruction INa and thus called "source operand," while the bit group a3 designates a storage destination of the data to processed on the instruction INa and thus called "destination operand". In the conventional technique, one instruction has included all the source operands and the destination operand required to carry out one instruction.

In the above example, the bit group a4 is a group of 4 bits, so the data processor can handle only 16 kinds of operation codes. To increase the number of operation codes to be handled by the processor more than 16, the number of bits of the instruction INa has to be increased. Thus, a 32-bit instruction has usually been adopted in the conventional technique. In this way, the increase in the number of operation codes to be handled by the processor results in the increase in the number of bits of the instruction INa.

SUMMARY OF THE INVENTION

A first aspect of the present invention is directed to a data processor comprising: a decoding portion receiving an instruction of a program in order, extracting at least one of first operand fields from predetermined bits of the instruction, and decoding an operation code, using the remaining bits; an operand-field storage portion including a first operand-field storage portion storing the first operand field received from the decoding portion, and a second operand-field storage portion storing a second operand field obtained on the basis of the first operand field; and a data processing portion with a plurality of registers, receiving the first operand field and the second operand field from the operand-field storage portion and processing data in registers designated by the first operand field and the second operand field out of the plurality of registers.

According to a second aspect of the present invention, the data processor of the first aspect further comprises: a control circuit detecting the completion of execution of the instruction. When the control circuit detects the completion of execution of the instruction, the operand-field storage portion transfers at least one of the first operand fields from the first operand-field storage portion to the second operand-field storage portion, as the second operand field.

According to a third aspect of the present invention, the data processor of the first aspect further comprises: a data calculation portion receiving at least one of the first operand fields from the decoding portion, calculating the second operand field from the first operand field, and storing the second operand field into the second operand-field storage portion.

According to a fourth aspect of the present invention, the data processor of the second aspect further comprises: a data holding portion saving data stored in the operand-field storage portion when an interruption occurs, and at the end of the interruption, returning the data to the operand-field storage portion.

According to a fifth aspect of the present invention, in the data processor of the first aspect, the decoding portion increases the number of the first operand fields with the instruction of a first kind, as compared with the instruction of a second kind. The data processor further comprises: a selector deciding whether to output the second operand field in the second operand-field storage portion to the processing portion or not depending on the second kind and the first kind of the instruction, respectively.

According to a sixth aspect of the present invention, in the data processor of the fifth aspect, the operation code includes a mode bit indicating whether the instruction is of the first kind or of the second kind.

In the data processor of the first aspect, part of the operand fields required to carry out the instruction is stored in the second operand-field storage portion. This avoids the necessity of including part of the operand fields in the instruction and increases the number of bits of the operation code in the instruction, thereby increasing the number of instructions that the data processor can handle.

In the data processor of the second aspect, when the execution of the instruction is completed, the first operand field can be set as the second operand field.

In the data processor of the third aspect, the data calculation portion can calculate the second operand field from the first operand field.

In the data processor of the fourth aspect, the contents in the operand-field storage portion remain unchanged before and after an interruption. This makes it possible to obtain a processing result originally intended.

In the data processor of the fifth aspect, an instruction using the second operand field in the second operand-field storage portion and an instruction including all operand fields required to carry out the instruction can be mixed in a single program.

In the data processor of the sixth aspect, the first kind and the second kind can be switched on an instruction basis.

Thus, an object of the present invention is to provide a data processor capable of increasing the number of operation codes it can handle, without increasing the number of bits of the instruction.

These and other objects, features, aspects and advantages of the present invention will become more apparent from the following detailed description of the present invention when taken in conjunction with the accompanying drawings.

DESCRIPTION OF THE PREFERRED EMBODIMENTS

1. First Preferred Embodiment

Figure 1:
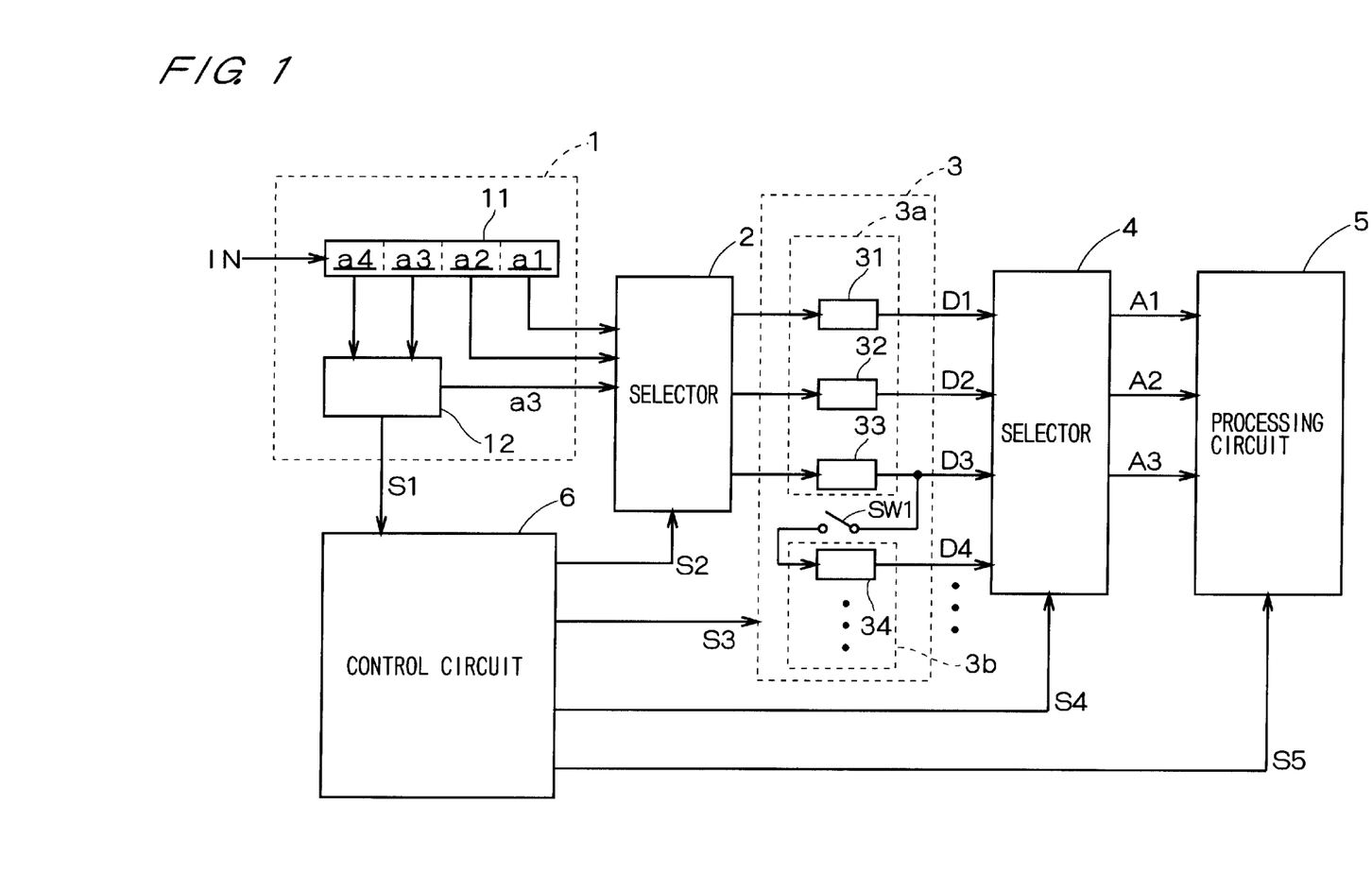
FIG. 1 is a block diagram of a data processor according to a first preferred embodiment of the present invention.

FIG. 1 is a block diagram of a data processor according to a first preferred embodiment of the present invention. In FIG. 1, 1 is a decoding circuit (decoding portion) receiving an instruction IN of a program in order, extracting operand fields (first operand fields) of the instruction IN, and decoding an operation code of the instruction IN; 3 is an operand-field storage portion receiving the first operand fields from the decoding circuit 1 via a selector 2 and storing the first operand fields; 4 is a selector receiving operand fields D1, D2, D3, D4, . . . stored in the operand-field storage portion 3 and selecting three of them to output the selected operand fields as operand fields A1 to A3; 5 is a processing circuit (data processing portion) receiving the operand fields A1 to A3 and processing data in general registers designated by the operand fields A1 to A3; and 6 is a control circuit receiving a control signal S1 (decoding result of the operation code) from the decoding circuit 1 and on the basis of the control signal S1, generating and outputting control signals S2 to S5 for controlling the selector 2, the operand-field storage portion 3, the selector 4, and the processing circuit 5, respectively.

The operand-field storage portion 3 includes a first operand-field storage portion 3a storing the first operand fields of the instruction IN, and a second operand-field storage portion 3b storing a second operand field obtained on the basis of the first operand fields.

Figure 2:
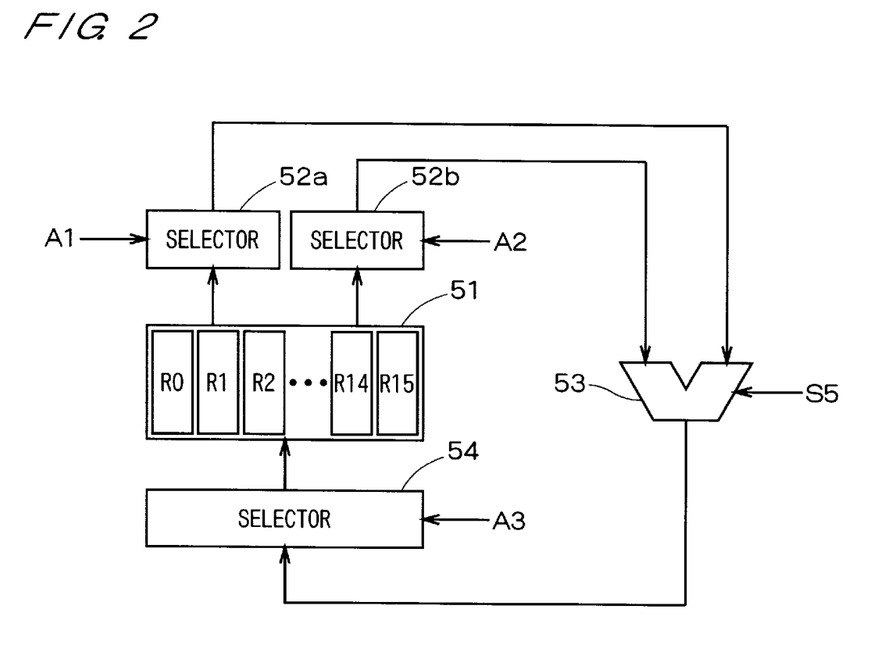
FIG. 2 is a block diagram of a processing circuit according to the first preferred embodiment.

An internal structure of the processing circuit 5 is shown in FIG. 2. The reference numerals and characters in FIG. 2 correspond to those in FIG. 14. More specifically, a register group 51 consists of 16 general registers R0 to R15 to which addresses #R0 to #R15 are assigned, respectively. Selectors 52a and 52b read data from general registers corresponding to the operand fields A1 and A2, respectively, in the register group 51. An arithmetic circuit 53 can perform arithmetic operations such as addition and subtraction. When the operation code is ADD, for example, the arithmetic circuit 53 adds data obtained by the selector 52a and data obtained by the selector 52b. A selector 54 writes the output of the arithmetic circuit 53 into a general register corresponding to the operand field A3 in the register group 51.

Figure 3:
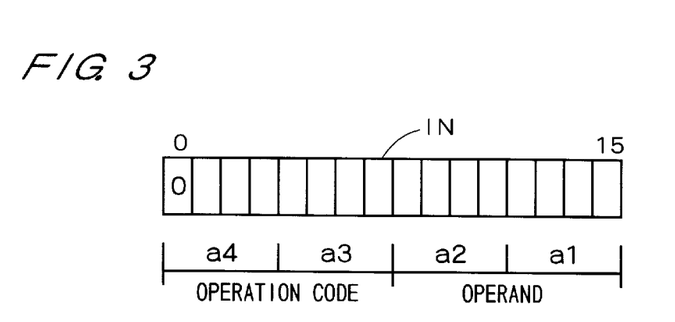
FIGS. 3 and 4 show formats of instructions according to the first preferred embodiment.
Figure 4:
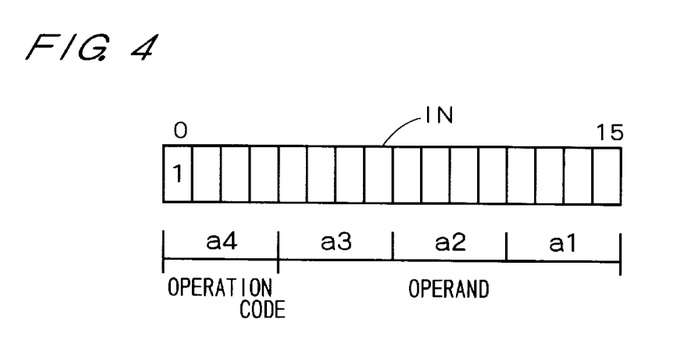

Now, we will describe the operation of this data processor. The data processor has an 8-bit mode and a 4-bit mode. In the 8-bit mode, the instruction IN has a format of the second kind as shown in FIG. 3, for example, having the zeroth bit (mode bit) of "0." In the 4-bit mode, the instruction IN has a format of the first kind as shown in FIG. 4, for example, having the zeroth bit of "1."

In the 8-bit mode, the operation code is 7 bits long except the mode bit, so the data processor can handle 128 kinds of operation codes. In the 4-bit mode, the operation code is 3 bits long except the mode bit, so the data processor can handle 8 kinds of operation codes. Accordingly, a total of 136 kinds of operation codes can be handled.

Next, we will describe the operation in the 8-bit mode, specifically, a case where a sum of data in the general register R0 and data in the general register R1 is written into the general register R2. A program in this case is shown in Table 2.

TABLE 2

| Instruction IN (Zeroth Bit = "0") | | | |
|---|---|---|---|
| a4 | a3 | a2 | a1 |
| LD |  | #R0 |  |
| ADDX |  | #R2 | #R1 |

In Table 2, LD is an instruction to write data previously prepared to a register designated by the destination operand; and ADDX is an instruction to add data in a register designated by a first source operand and data in a register designated by a second source operand and write the result of the addition to a register designated by a destination operand.

First, a latch circuit 11 latches the first instruction IN, "LD/#R0." From the mode bit "0" of the instruction, an instruction decoding portion 12 identifies the mode as the 8-bit mode. Then, the decoding circuit 1 extracts the eighth to fifteenth bits (a1, a2) of the instruction IN as first operand fields and decodes an operation code, using the remaining zeroth to seventh bits (a3, a4). The bit group a2 designates an address #R0. When the instruction decoding portion 12 judges the operation code as LD (data transfer instruction), the control circuit 6 controls the selector 2 and the operand-field storage portion 3 so that the selector 2 writes the bit group a2 into an operand-filed storage region 33 of the operand-field storage portion 3. That is, on the LD instruction, data previously prepared is written into a register designated by the operand-field storage region 33. When the control circuit 6 detects the completion of execution of the LD instruction, the operand-field storage portion 3 turns on a switch SW1 to transfer the operand field D3 in the operand-field storage region 33, out of the first operand fields, to a operand-field storage region 34 as a second operand field. Thus, the address #R0 is written to the operand-field storage region 34.

Next, the latch circuit 11 latches the next instruction IN, "ADDX/#R2, #R1." Since the mode bit of the instruction is "0", like the previous instruction, the decoding circuit 1 extracts the eighth to fifteenth bits (a1, a2) of the instruction IN as first operand fields and decodes an operation code, using the remaining zeroth to seventh bits (a3, a4). The bit groups a2 and a1 designate the addresses #R2 and #R1, respectively. When the instruction decoding portion 12 judges the operation code as ADDX, the control circuit 6 controls the selector 2 and the operand-field storage portion 3 so that the selector 2 writes the bit groups a1 and a2 into the operand-field storage regions 31 and 33 of the operand-field storage portion 3, respectively. At this time, the operand-field storage portions 34, 31, and 33 store the addresses #R0, #R1, and #R2, respectively. Then, the selector 4 outputs the operand field D1 in the operand-field storage region 31, the operand field D4 in the operand-field storage region 34, and the operand field D3 in the operand-field storage region 33 as the operand fields A1, A2, and A3, respectively. Accordingly, in the processing circuit 5, the selectors 52a and 52b read out data in the general register R1 and data in the general register R0, respectively; the arithmetic circuit 53 calculates a sum of the data in the general register R1 and the data in the general register R0; and the selector 54 writes the sum to the general register R2. When the control circuit 6 detects the completion of execution of the ADDX instruction, the operand-field storage portion 3 turns on the switch SW1 to transfer the operand field D3 in the operand-field storage region 33, out of the first operand fields, to the operand-field storage region 34 as a second operand field. Thus, the address #R2 is written to the operand-field storage region 34.

Figure 5:
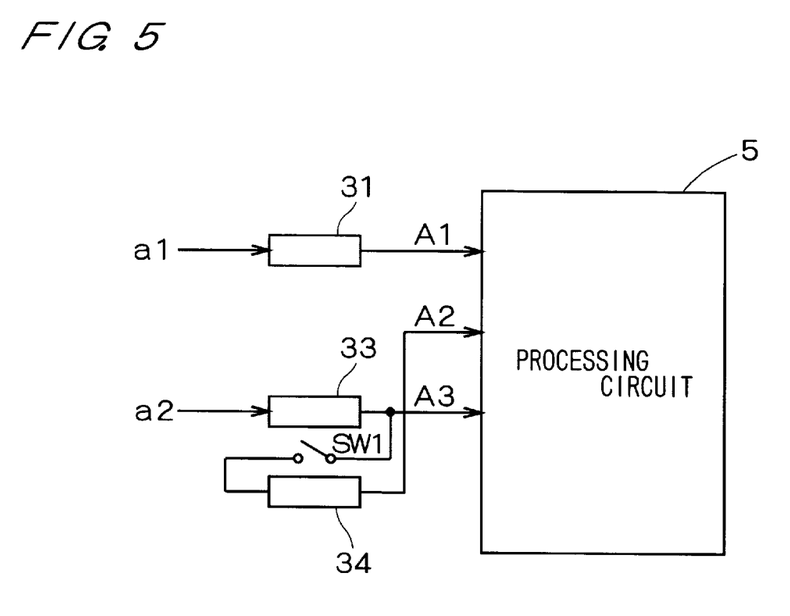
FIGS. 5 and 6 are block diagrams equivalently showing the operation of the data processor according to the first preferred embodiment.

FIG. 5 equivalently shows the aforementioned operation. In the 8-bit mode, by the execution of the LD instruction, the bit group a2 is transferred to the operand-field storage region 34 via the operand-field storage region 33 and the switch SW1. After that, by the execution of the ADDX instruction, the bit groups a2 and a1 are written into the operand-field storage regions 33 and 31, respectively. Then, the processing circuit 5 processes the data in the general registers designated by the operand fields A1 to A3.

In this fashion, part of the operand fields required to carry out the ADDX instruction is previously stored in the second operand-field storage portion 3b. This avoids the necessity of including part of the operand fields in the instruction IN and increases the number of bits of the operation code in the instruction, thereby increasing the number of instructions that the processor can handle.

Next, we will describe the operation in the 4-bit mode, specifically, a case where a sum of the data in the general resister R0 and the data in the general register R1 is written into the general resistor R2. A program in this case is shown in Table 3.

TABLE 3

| Instruction IN (Zeroth Bit = "1") | | | |
|---|---|---|---|
| a4 | a3 | a2 | a1 |
| ADD0 | #R2 | #R1 | #R0 |

In Table 3, ADD0 is an instruction to add data in a register designated by the first source operand and data in a register designated by the second source operand and write the result of the addition into a register designated by the destination operand.

First, the latch circuit 11 latches the instruction IN, "ADD0/#R2, #R1, #R0." From the mode bit "1" of the instruction, the instruction detecting portion 12 identifies the mode as the 4-bit mode. Then, the decoding circuit 1 extracts the fourth to fifteenth bits (a1, a2, a3) of the instruction IN as first operand fields and decodes an operation code, using the remaining zeroth to third bits (a4). That is, in the 4-bit mode as compared in the 8-bit mode, the decoding circuit 1 increases the number of first operand fields. The bit groups a3, a2, and a1 designate the addresses #R2, #R1, and #R0, respectively. When the instruction decoding portion 12 judges the operation code as ADD0, the control circuit 6 controls the selector 2 and the operand-field storage portion 3 so that the selector 2 writes the bit groups a1, a2, a3 into the operand-field storage regions 31, 32, and 33 of the operand-field storage portion 3, respectively. Then, the selector 4 outputs the operand field D1 in the operand-field storage region 31, the operand field D2 in the operand-field storage region 32, and the operand field D3 in the operand-field storage region 33 as the operand fields A1, A2, and A3, respectively. Accordingly, in the processing circuit 5, the selectors 52a and 52b read out data from the general registers R0 and R1, respectively; the arithmetic circuit 53 calculates a sum of the data in the general register R0 and the data in the general register R1; and the selector 54 writes the sum into the general register R2.

Figure 6:
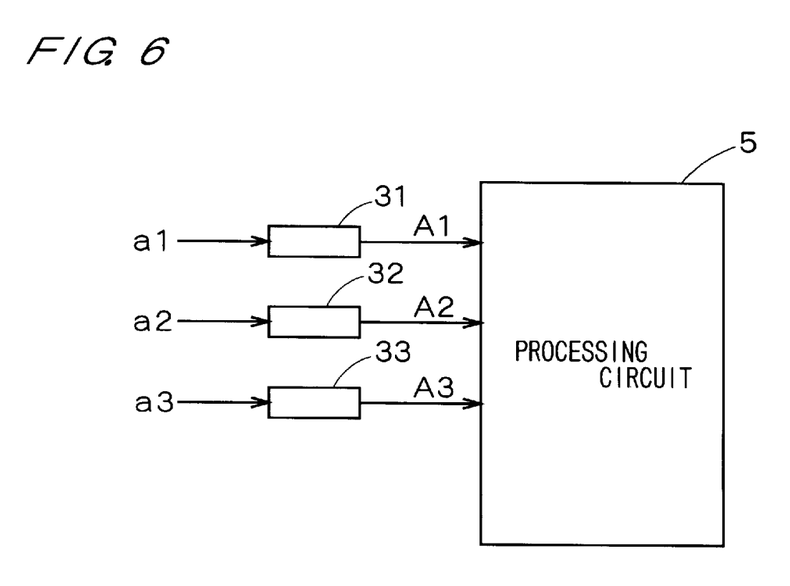

FIG. 6 equivalently shows the aforementioned operation. In the 4-bit mode, by the execution of the ADD0 instruction, the bit groups a1 to a3 are written to the operand-field storage regions 31 to 33, respectively. Then, the processing circuit 5 processes the data in the general registers designated by the operand fields A1 to A3.

As shown in FIGS. 5 and 6, the selector 4 determines whether to output the operand field D4 in the operand-field storage region 34 of the second operand-field storage portion 3b to the processing circuit 5 or not depending on the 8-bit mode and the 4-bit mode indicated by the mode bit, respectively. This allows a single program to include both the operation code ADDX using the operand field D4 in the second operand-field storage portion 3b and the operation code ADD0 including all operand fields required to carry out the instruction.

Further, since the operation code includes the mode bit, the data processor can be switched between the 8-bit mode and the 4-bit mode on an instruction basis.

2. Second Preferred Embodiment

Figure 7:
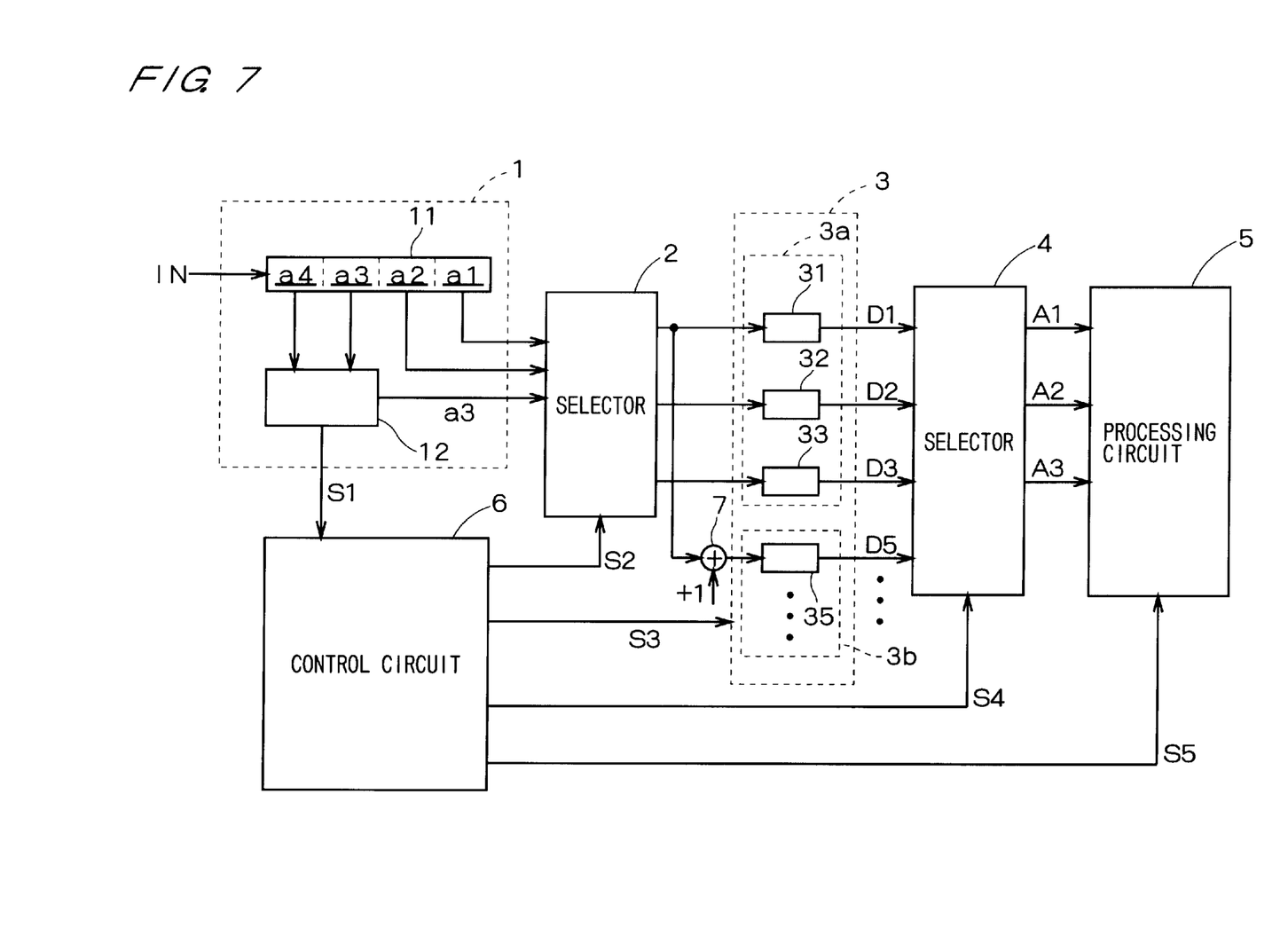
FIG. 7 is a block diagram of a data processor according to a second preferred embodiment of the present invention.

FIG. 7 is a block diagram of a data processor according to a second preferred embodiment of the present invention.

In FIG. 7, 7 is an adder (data calculation portion) receiving the first operand fields from the decoding circuit 1 via the selector 2, calculating the second operand field from the first operand fields, and storing the second operand field into an operand-field storage region 35 of the second operand-field storage portion 3b. The other part of the structure is identical with that in the first preferred embodiment.

Now, the operation of this data processor will be described. As in the first preferred embodiment, the data processor has the 4-bit mode and the 8-bit mode. The operation in the 4-bit mode is identical with that in the first preferred embodiment, so the description thereof will be omitted. We will now describe the operation in the 8-bit mode, specifically, a case where a sum of the data in the general register R0 and the data in the general register R1 is written into the general register R2. A program in this case is shown in Table 4.

TABLE 4

| Instruction IN (Zeroth Bit = "0") | | | |
|---|---|---|---|
| a4 | a3 | a2 | a1 |
| ADDY | | #R2 | #R0 |

In Table 4, ADDY is an instruction to add data in a register designated by the first source operand and data in a register designated by the second source operand, and write the result of the addition into a register designated by the destination operand.

First, the latch circuit 11 latches an instruction IN, "ADDY/#R2, #R0." Since the mode bit of the instruction is "0", the decoding circuit 1 extracts the eighth to fifteenth bits (a1, a2) of the instruction IN as first operand fields, and decodes an operation code, using the remaining zeroth to seventh bits (a3, a4). The bit groups a2 and a1 designate the addresses #R2 and #R0, respectively. When the instruction decoding portion 12 judges the operation code as ADDY, the control circuit 6 controls the selector 2 and the operand-field storage portion 3 so that the selector 2 writes the bit groups a1 and a2 into the operand-field storage regions 31 and 33 of the operand-field storage portion 3, respectively. The bit group a1 is also inputted to the adder 7. The adder 7 writes data obtained by adding one to the bit group a1, namely, #R1, to the operand-field storage region 35. At this time, the addresses #R0, #R1, and #R2 are stored in the operand-field storage regions 31, 35, and 33, respectively. Then, the selector 4 outputs the operand filed D1 in the operand-field storage region 31, the operand field D5 in the operand-field storage region 35, and the operand field D3 in the operand-field storage region 33 as the operand fields A1, A2, and A3, respectively. Accordingly, in the processing circuit 5, the selectors 52a and 52b read out data from the general registers R0 and R1, respectively; the arithmetic circuit 53 calculates a sum of the data in the general register R0 and the data in the general register R1; and the selector 54 writes the sum into the general register R2.

Figure 8:
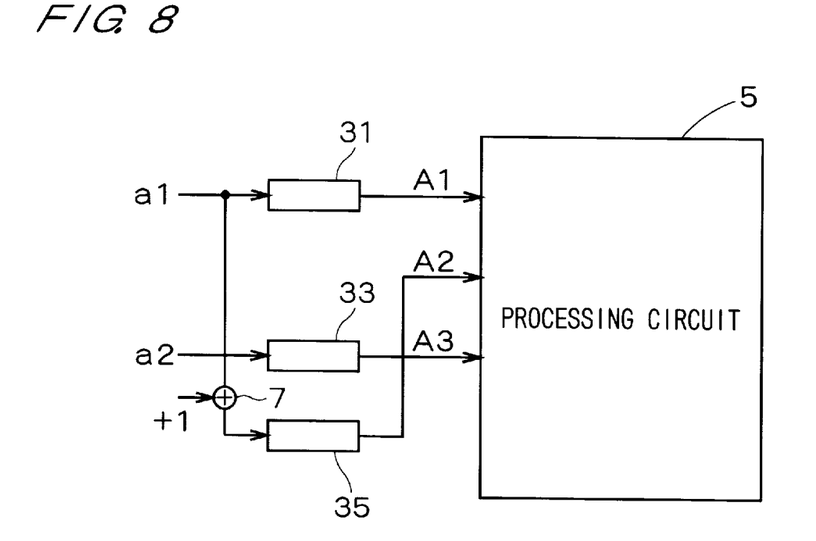
FIG. 8 is a block diagram equivalently showing the operation of the data processor according to the second preferred embodiment.

FIG. 8 equivalently shows the aforementioned operation. In the 8-bit mode, by the execution of the ADDY instruction, the bit groups a1 and a2 are written to the operand-field storage regions 31 and 33, respectively, and the data obtained by adding one to the bit group a1 by the adder 7 is written to the operand-field storage region 35. After that, the processing circuit 5 processes the data in the general registers designated by the operand fields A1 to A3.

In this fashion, the adder 7 allows a program to set the operand field D5 in the second operand-field storage portion 3b.

3. Third Preferred Embodiment

In the aforementioned first preferred embodiment, an interruption may take place between the LD instruction and the ADDX instruction of the program, and thus the contents in the operand-field storage region 34 may be rewritten during the interrupt operation. In this case, if the ADDX instruction is executed after the interrupt operation, a processing result originally intended may not be obtained.

Figure 9:
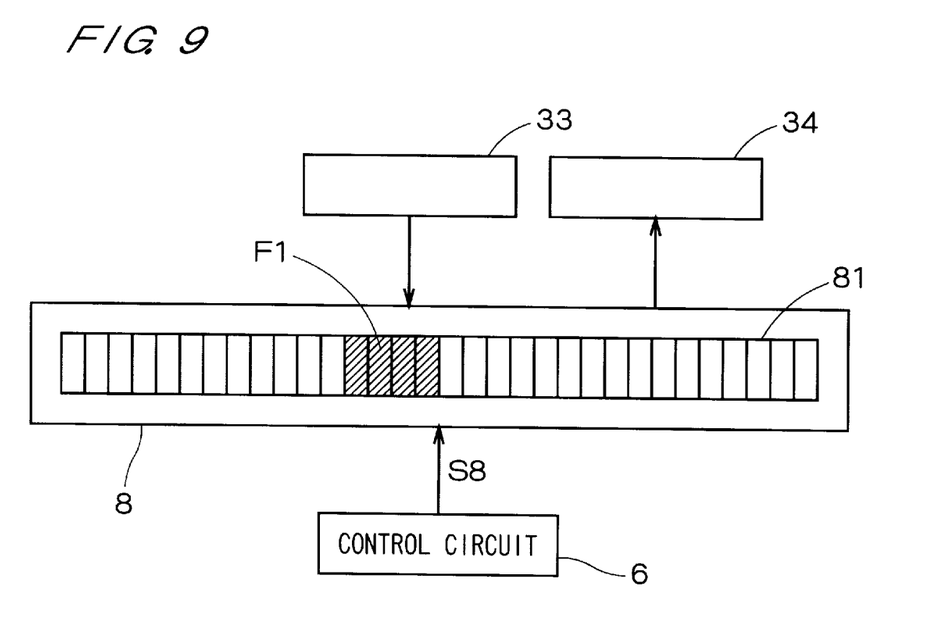
FIG. 9 is a block diagram of part of a data processor according to a third referred embodiment of the present invention.

For this reason, as shown in FIG. 9, a data holding portion 8 is provided to save data in the operand-field storage region 33 when an interruption occurs, and after the interrupt operation, return the data to the operand-field storage region 34.

The data holding portion 8 includes a processor state word (PSW) 81. Controlled by a control signal S8 from the control circuit 6, the data holding portion 8 saves the operand field in the operand-field storage region 33 on a specific region F1 of the PSW 81 when an interruption occurs. Especially, when an interruption occurs during the execution of the LD instruction, the data holding portion 8 once transfers the operand filed in the operand-field storage region 33 to the operand-field storage region 34 via the switch SW1, and then saves the operand field in the operand-field storage region 33 on the specific region F1 of the PSW 81. During the interrupt operation, the contents in the region F1 remain unchanged. When the interrupt operation is terminated, the data holding portion 8 returns the data in the region F1 of the PSW 81 to the operand-field storage region 34.

In this fashion, the contents in the operand-field storage region 34 remain unchanged before and after the interruption. This makes it possible to obtain a processing result originally intended.

4. Fourth Preferred Embodiment

Figure 10:
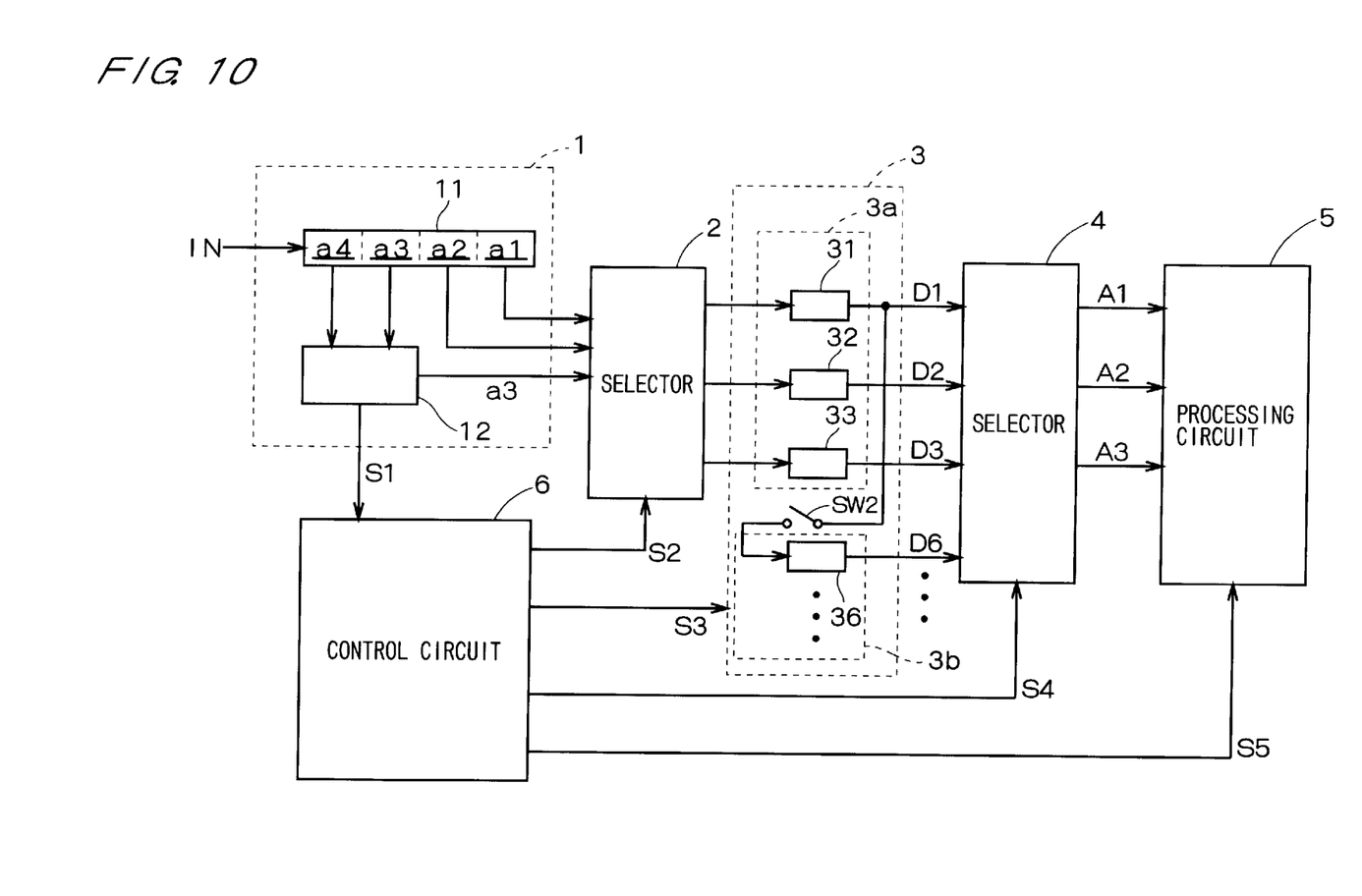
FIG. 10 is a block diagram of a data processor according to a fourth preferred embodiment of the present invention.

FIG. 10 is a block diagram of a data processor according to a fourth preferred embodiment of the present invention. In FIG. 10, SW2 is a switch which is turned on at the time of execution of ST (data transfer instruction) to store the first operand field D1 in the operand-field storage region 31 into the operand-field storage region 36 of the second operand-field storage portion 3b as a second operand field. The other part of the structure is identical with that in the first preferred embodiment.

Now, the operation of this data processor will be described. As in the first preferred embodiment, the data processor has the 4-bit mode and the 8-bit mode. The operation in the 4-bit mode is identical with that in the first preferred embodiment, so the description thereof will be omitted. We will now describe the operation in the 8-bit mode, specifically, a case where a sum of the data in the general register R0 and the data in the general register R1 is written into the general register R2. First, the address #R0 of the general register R0 is previously written to the operand-field storage region 31. Then, a program shown in Table 5 is executed.

TABLE 5

| Instruction IN (Zeroth Bit = "0") | | | |
|---|---|---|---|
| a4 | a3 | a2 | a1 |
| ST | | #R0 | |
| ADDZ | | #R2 | #R1 |

In Table 5, ST is an instruction to write data stored in a register designated by the destination operand into a predetermined region; and ADDZ is an instruction to add data in a register designated by the first source operand and data in a register designated by the second source operand, and write the result of the addition into a register designated by the destination operand.

First, the latch circuit 11 latches an instruction IN, "ST/ #R0." From the mode bit "0" of the instruction, the instruction decoding portion 12 identifies the mode as the 8-bit mode. Then, the decoding circuit 1 extracts the eighth to fifteenth bits of the instruction IN (a1, a2) as first operand fields, and decodes an operation code, using the remaining zeroth to seventh bits (a3, a4). The bit group a2 designates the address #R0. When the instruction decoding portion 12 judges the operation code as ST, the control circuit 6 controls the selector 2 and the operand-field storage portion 3 so that the selector 2 writes the bit group a2 into the operand-field storage portion 31 of the operand-field storage portion 3. On the ST instruction, data stored in a register designated by the operand-field storage region 33 is written into a predetermined region. When the control circuit 6 detects the completion of execution of the ST instruction, the operand-field storage portion 3 turns on the switch SW2 to transfer the operand field D1 in the operand-field storage region 31, out of the first operand fields, to an operand-field storage region 36 as a second operand field. Thus, the address #R0 is written to the operand-field storage region 36.

Next, the latch circuit 11 latches the next instruction IN, "ADDZ/#R2, #R1." Since the mode bit of the instruction is "0", like the previous instruction, the decoding circuit 1 extracts the eighth to fifteenth bits (a1, a2) of the instruction IN as first operand fields, and decodes an operation code, using the remaining zeroth to seventh bits (a3, a4). The bit groups a2 and a1 designate the addresses #R2 and #R1, respectively. When the instruction decoding portion 12 judges the operation code as ADDZ, the control circuit 6 controls the selector 2 and the operand-field storage portion 3 so that the selector 2 writes the bit groups a1 and a2 into the operand-field storage regions 31 and 33 of the operand-field storage portion 3, respectively. At this time, the operand-field storage regions 36, 31, and 33 stores the addresses #R0, #R1, and #R2, respectively. Then, the selector 4 outputs the operand field Di in the operand-field storage region 31, the operand field D6 in the operand-field storage region 36, and the operand field D3 in the operand-field storage region 33 as operand fields A1, A2, and A3, respectively. Accordingly, in the processing circuit 5, the selectors 52a and 52b read data from the general registers R1 and R0, respectively; the arithmetic circuit 53 calculates a sum of the data in the general register R1 and the data in the general register R0; and the selector 54 writes the sum into the general register R2. When the control circuit 6 detects the completion of execution of the ADDZ instruction, the operand-field storage portion 3 turns on the switch SW2 to transfer the operand field D1 in the operand-field storage region 31, out of the first operand fields, to the operand-field storage region 36 as a second operand field. Thus, the address #R1 is written to the operand-field storage region 36.

Figure 11:
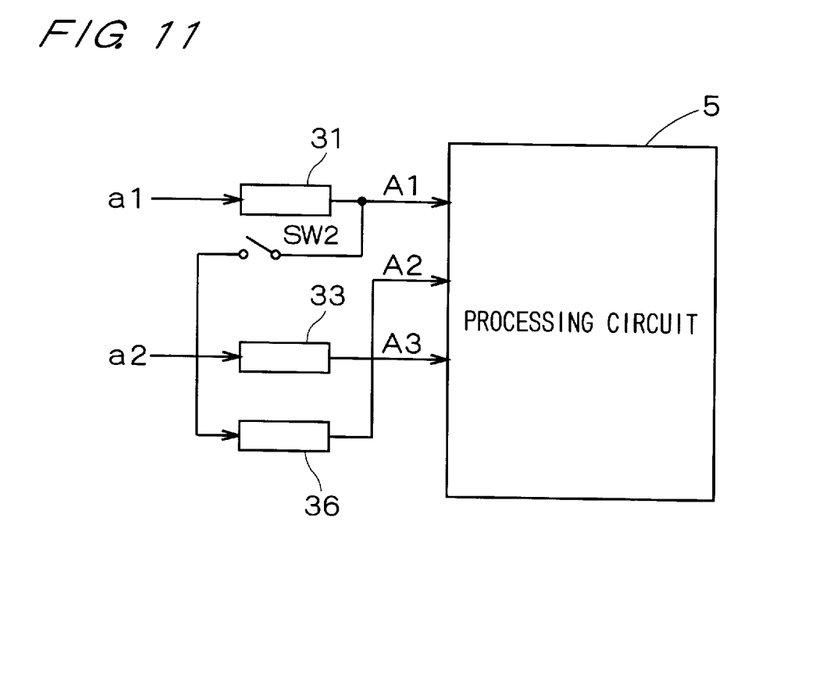
FIG. 11 is a block diagram equivalently showing the operation of the data processor according to the fourth preferred embodiment.

FIG. 11 equivalently shows the aforementioned operation. In the 8-bit mode, by the execution of the ST instruction, the bit group a2 is transferred to the operand-field storage region 36 via the operand-field storage region 31 and the switch SW2, and by the execution of the ADDZ instruction, the bit groups a1 and a2 are written to the operand-field storage regions 31 and 33, respectively. After that, the processing circuit 5 processes the data in the general registers designated by the operand fields A1 to A3.

5. Fifth Preferred Embodiment

In the aforementioned fourth preferred embodiment, an interruption may take place between the ST instruction and the ADDZ instruction of the program in Table 5, and the contents in the operand-field storage region 36 may be rewritten during the interrupt operation. In this case, if the ADDZ instruction is executed after the interrupt operation, a processing result originally intended may not be obtained.

Figure 12:
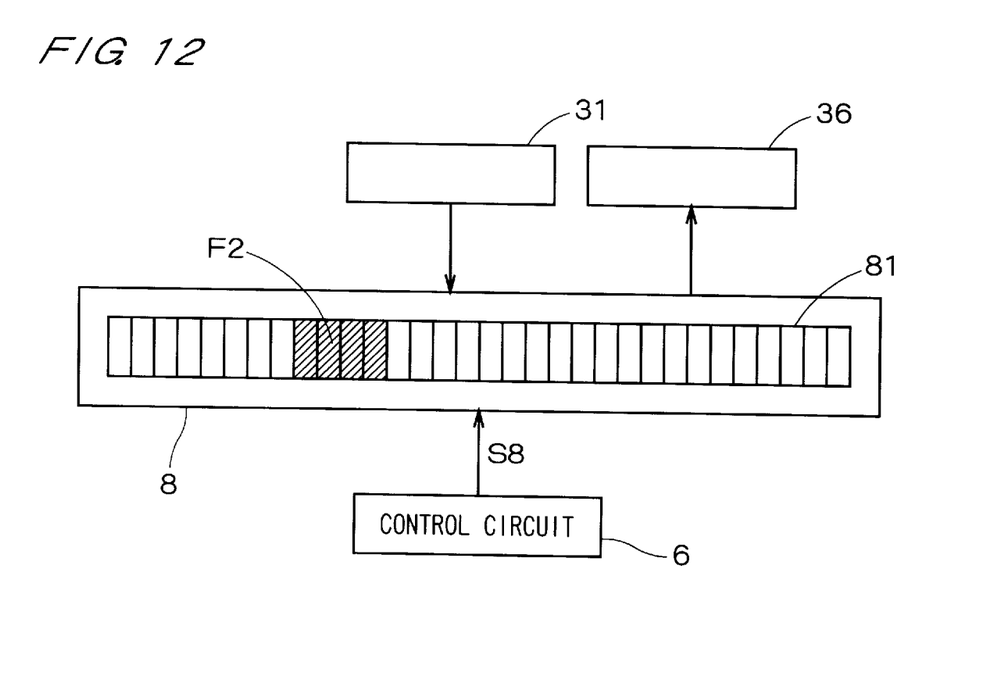
FIG. 12 is a block diagram of part of a data processor according to a fifth preferred embodiment of the present invention.

For this reason, as shown in FIG. 12, there is provided the data holding portion 8 identical with that in FIG. 9.

Controlled by the control signal S8 from the control circuit 6, the data holding portion 8 saves the operand field in the operand-field storage region 31 on a specific region F2 of the PSW 81 when an interruption occurs. Especially, when an interruption occurs during the execution of the ST instruction, the data holding portion 8 once transfers the operand field in the operand-field storage region 31 to the operand-field storage region 36 via the switch SW2, and then saves the operand field in the operand-field storage region 31 on the specific region F2 of the PSW 81. During the interrupt operation, the contents in the region F2 remain unchanged. When the interrupt operation is terminated, the data holding portion 8 returns the operand field in the region F2 of the PSW 81 to the operand-field storage region 36.

In this fashion, the contents in the operand-field storage region 36 remain unchanged before and after the interruption. This makes it possible to obtain a processing result originally intended.

6. Modifications

The present invention is not limited to the configurations disclosed in the drawings. The instruction may include only one operand field, or it may include four or more operand fields, instead of two or three.

Further, in the first and the fourth preferred embodiments, only one operand field is transferred from the first operand-field storage portion 3a to the second operand-field storage portion 3b on the data transfer instruction, for example, the operand field D3 on the LD instruction and the operand field D1 in the ST instruction, respectively. However, the data transfer instruction may transfer more than one operand fields.

Further, in the second preferred embodiment, the number of first operand fields received by the adder (data calculation portion) 7 and the number of second operand fields calculated by the adder 7 are both one. Those numbers, however, may be more than one.

Further, the data transfer instruction needs not be ST nor LD, and the PSW 81 in the data holding portion may be substituted by other elements. Also, the mode bit may be given by other elements, instead of the instruction.

Further, a region on which the data holding portion 8 in FIG. 9 saves the operand field when an interruption occurs and a region to which the data holding portion 8 returns that operand field after the interrupt operation may be both the operand-field storage region 34.

Further, a region on which the data holding portion 8 in FIG. 11 saves the operand field when an interruption occurs and a region to which the data holding portion 8 returns that operand field after the interrupt operation may be both the operand-field storage region 36.

While the invention has been described in detail, the foregoing description is in all aspects illustrative and not restrictive. It is understood that numerous other modifications and variations can be devised without departing from the scope of the invention.

We claim:

1. A data processor comprising:

a decoding portion receiving an instruction of a program in order, said instruction including a plurality of operand fields and an operation code, extracting at least one operand field from a predetermined number of bits of said instruction as a first operand field, and decoding the operation code using remaining number of bits of said instruction, wherein the predetermined number of bits being variable and depending upon said operation code;

an operand-field storage portion including a first operand-field storage portion storing said first operand fields received from said decoding portion, and a second operand-field storage portion storing part of said first operand fields as a second operand field based on said first operand field; and a data processing portion with a plurality of registers, receiving said first operand fields and said second operand field from said operand-field storage portion and processing data in registers designated by said first operand fields and said second operand field out of said plurality of registers, wherein the predetermined number of bits being variable and depending upon said operation code.

2. The data processor of claim 1, further comprising:

a control circuit detecting the completion of execution of said instruction, wherein, when said control circuit detects the completion of execution of said instruction, said operand-field storage portion transfers at least one of said first operand fields from said first operand-field storage portion to said second operand-field storage portion, as said second operand field.

3. The data processor of claim 1, further comprising:

a data calculation portion receiving at least one of said first operand fields from said decoding portion, calculating said second operand field from said first operand field, and storing said second operand field into said second operand-field storage portion.

4. The data processor of claim 2, further comprising:

a data holding portion saving data stored in said operand-field storage portion when an interruption occurs, and at the end of said interruption, returning said data to said operand-field storage portion.

5. The data processor of claim 1, wherein said decoding portion increases the number of said first operand fields with said instruction of a first kind, as compared with said instruction of a second kind, said data processor further comprising:

a selector deciding whether to output said second operand field in said second operand-field storage portion to said processing portion or not depending on said second kind and said first kind of said instruction, respectively.

6. The data processor of claim 5, wherein said operation code includes a mode bit indicating whether said instruction is of said first kind or of said second kind.

* * * * *